US006890759B2

(12) United States Patent
Bierre et al.

(10) Patent No.: US 6,890,759 B2
(45) Date of Patent: May 10, 2005

(54) SYSTEM AND METHOD FOR UNIVERSAL IDENTIFICATION OF BIOLOGICAL SAMPLES

(75) Inventors: Pierre Bierre, Pleasanton, CA (US); Sreedhar Payavala, San Jose, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 09/223,347

(22) Filed: Dec. 30, 1998

(65) Prior Publication Data

US 2001/0049147 A1 Dec. 6, 2001

(51) Int. Cl.[7] .................................................. G01N 21/03
(52) U.S. Cl. ...................... 436/165; 422/915; 206/459.1
(58) Field of Search ...................... 436/165; 206/459.1; 422/915, 807

(56) References Cited

U.S. PATENT DOCUMENTS

| | | | | | |
|---|---|---|---|---|---|
| 3,897,216 | A | * | 7/1975 | Jones | 422/104 |
| 3,973,345 | A | | 8/1976 | Isobe | |
| 4,164,320 | A | | 8/1979 | Irazoqui et al. | |
| 4,230,266 | A | | 10/1980 | Juvinall | |
| 4,476,381 | A | | 10/1984 | Rubin | |
| 4,842,153 | A | | 6/1989 | Hulon | |
| 4,877,134 | A | * | 10/1989 | Klein | 206/443 |
| 4,917,011 | A | | 4/1990 | Bernauer | 101/92 |
| 4,985,115 | A | * | 1/1991 | De Rossett, Jr. | 156/654 |
| 5,000,484 | A | | 3/1991 | Phelan | |
| 5,286,959 | A | | 2/1994 | Demachi | |
| 5,397,410 | A | * | 3/1995 | Handly | 156/89 |
| 5,404,523 | A | | 4/1995 | DellaFera et al. | 395/650 |
| 5,609,778 | A | * | 3/1997 | Pulaski et al. | 219/121.69 |
| 5,623,415 | A | * | 4/1997 | O'Bryan et al. | 700/225 |
| 5,683,786 | A | * | 11/1997 | Kavanaugh | 428/195 |
| 5,801,356 | A | * | 9/1998 | Richman | 219/121.68 |
| 5,812,793 | A | | 9/1998 | Shakib et al. | 395/200.31 |
| 6,132,818 | A | * | 10/2000 | Tanaka et al. | 427/596 |
| 6,180,351 | B1 | * | 1/2001 | Cattell | 435/6 |

FOREIGN PATENT DOCUMENTS

JP 08304410 * 11/1996

OTHER PUBLICATIONS

Daniel W. Chan, *Immunoassay Automation: A Practical Guide* (San Diego: Academic Press, Inc., 1992), Chapter 2, pp. 14–17.

* cited by examiner

*Primary Examiner*—Jill Warden
*Assistant Examiner*—LaToya I. Cross
(74) *Attorney, Agent, or Firm*—Alan W. Fiedler

(57) ABSTRACT

A system and method for identifying a biological sample associated with a container is disclosed. A universally unique-identifier is associated with each container. In one or more embodiments, the identifier comprises one or more markings having a specular reflectance which differs from the specular reflectance of the outer surface of the container adjacent the markings. A detection apparatus detects the differences in specularly reflected light to identify the identifier associated with the container. The identifier is associated with certain information regarding the container and biological sample. From that point forward, any information about the contents of the container may be retrieved by searching on its container ID. Because the container ID is assured by its manufacturer to be universally-unique, the container and sample may move from one organization to another under the same identifier, and information about the contents of the container may be shared by querying on its container ID. Practically, the sample ID becomes universal by virtue of presenting a universally-understood search key usable by anyone who needs to process the container. By suitably restricting access to sensitive database fields, patient confidentiality may more easily be assured since the marking on the specimen does not reveal any such information.

20 Claims, 5 Drawing Sheets a) Laser-etching Using CO2 Laser at 3W b) Translucent Adhesive Tape

SYSTEM AND METHOD FOR UNIVERSAL IDENTIFICATION OF BIOLOGICAL SAMPLES

BACKGROUND OF THE INVENTION

1. Field of the Invention

The present invention relates to a system and method for identifying biological samples.

2. Background Art

Identification of biological samples is of critical importance. For example, tests on a particular patient's blood sample may reveal an illness requiring medical treatment. If the sample cannot at all times be identified and associated with the patient from whom the sample was taken, the patient may be denied necessary treatment, or undergo unnecessary treatment.

Biological samples, including blood samples, are often placed in individual containers such as test tubes or vials. A common method of identifying a sample is to provide sample identifying information on the container. In one arrangement, identification data such as a patient's name, social security number or other identification number is printed or written on a label that is placed on the container in human readable form. In other arrangements a printed bar code label is affixed to each container.

One problem with these identification arrangements or schemes is that they are not universal, but specific only to the organization which develops and implements the arrangement or scheme. A hospital may use one identification scheme and an outside laboratory may use another completely incompatible scheme. As a result, even though the scheme may properly identify the sample when it is at the hospital, it may provide no usable identification when the sample is sent to the outside laboratory.

Another problem with these prior art schemes is that they do not ensure unique identification of each container. For example, if a patient's social security number is used as the identifier, all samples for that patient will use the same identifier. As a result, the identification system may not facilitate the unique identification of the later samples when a sample is split or additional samples are obtained from that patient.

These prior art identifying arrangements and schemes also permit tampering. For example, a patient may provide the wrong social security number or name, resulting in duplicity with other samples belonging to a patient having that true number or name.

For a scheme that marks the container with human readable information, another problem is the lack of patient confidentiality. Anyone who encounters the sample may easily identify the patient to which the sample corresponds.

The use of these types of identification systems also requires an organization to implement a particular system, including obtaining the necessary marking and detection equipment. For example, if a hospital chooses to bar code label its sample containers, appropriate label printing and reading equipment must be obtained.

Numerous problems are associated with identification systems that require the user to place a label on each container. The label may be misprinted, may be affixed to the wrong container, may become damaged and unreadable, or may become separated from the container. Labels also present problems to automated label detection apparatus or equipment. When the container is used by more than one organization, multiple labels may be placed over one another on a single container, changing the dimensions of the container. The change in dimension of the container may prevent the container from being used with certain equipment or may damage the equipment.

Normally each label is affixed with adhesive to the container. When the container has a curved outer surface, the ends of the label tend to pull away from the container surface. When the container is subsequently moved through automated detection equipment, loose portions of the label may be damaged or may damage the detection equipment. Adhesive may also be transferred from the label or container to the detection equipment, damaging the equipment.

Another problem with labels is that they are very often opaque. For example, to easily permit a user to read written information, labels are often white paper written on with dark ink. As a result, the label obscure the view of the contents of the container. This is very disadvantageous when, for example, it is necessary to view the level of a fluid in the container. Even if the label is fairly transparent, the printed areas of the label are likely to be opaque.

For automated equipment to be able to read these labels, the labels must often be specifically oriented on the container and the container must be specifically oriented with respect to a detection apparatus of the equipment. This may require that an operator align the label on each container with the detection apparatus.

Another problem with prior art identification schemes is that they often do not provide sufficient data space for all of the desired information. Only a small amount of information may be written or printed on a blank label.

There are other problems which specifically relate to the use of bar code labeling systems. A first problem is that the contents of the container may interfere with the detection of the bar code information. The bar code comprises printed dark bands on a light substrate. Detection of the bar code is accomplished by sensing the intensity of diffuse light reflected from the bar code area. If the contents of the container are dark, the differences in light intensity between the printed bar code bands and surrounding substrate may be difficult to ascertain, interfering with the bar code detection.

A system and method for identifying biological samples that overcomes the above-stated problems is desired.

SUMMARY OF THE INVENTION

The present invention is a system and method for uniquely identifying biological samples, whereby each sample is associated with a container having a universally unique identifier. Such containers are manufactured with the container identifier pre-marked before use of the container by the customer. The identifier comprises one or more markings defining a pattern comprising a machine-readable container ID.

In one embodiment, the markings define areas having a specular reflectance which is less than that of the adjacent surface of the container. These markings may comprise, among other things, abraded or etched areas of the surface of the container or the surface of a thin film applied to the container.

In another embodiment, the markings define areas having a specular reflectance which is greater than that of the adjacent surface of the container. These markings may comprise, among other things, melted areas of the surface of the container or a smooth film applied to the surface of the container.

The markings are arranged on the container to provide a unique identifier for that container. In one embodiment, the markings comprise vertically spaced rings which extend around the perimeter of the container. In another embodiment, the markings are shaped as short bars and spaced from one another vertically along the outer surface of the container. In yet another embodiment, the markings are shaped as short bars and spaced from one another horizontally around the outer surface of the container.

A detection apparatus is provided for detecting the identifier associated with each container. In one embodiment, the detection apparatus comprises a light emitter and detector pair. The light is emitted towards a container while the container is moving relative to the light, and the specularly reflected light is detected by the detector. In one embodiment, the detection apparatus comprises a charge-coupled device.

Each identifier may be associated with a variety of information regarding the container and contained sample.

Further objects, features, and advantages of the present invention over the prior art will become apparent from the detailed description of the invention which follows, when considered with the attached Figures.

BRIEF DESCRIPTION OF THE DRAWINGS

FIG. 5(*b*) is a graph illustrating the output of a detection apparatus of the invention utilized to detect markings formed by translucent adhesive tape.

DETAILED DESCRIPTION OF THE INVENTION

The present invention comprises a system and method for identifying biological samples. Each sample is associated with a particular container. Each container is marked with a universally-unique identifier comprising one or more identifying markings formed on the container that uniquely identify that container. Means are provided for detecting or reading the markings to determine the identifying information.

In the following description, numerous specific details are set forth in order to provide a more thorough description of the invention. It will be apparent, however, to one skilled in the art, that the invention may be practiced without these specific details. In other instances, well-known features have not been described in detail so as not to obscure the invention.

Figure 1:
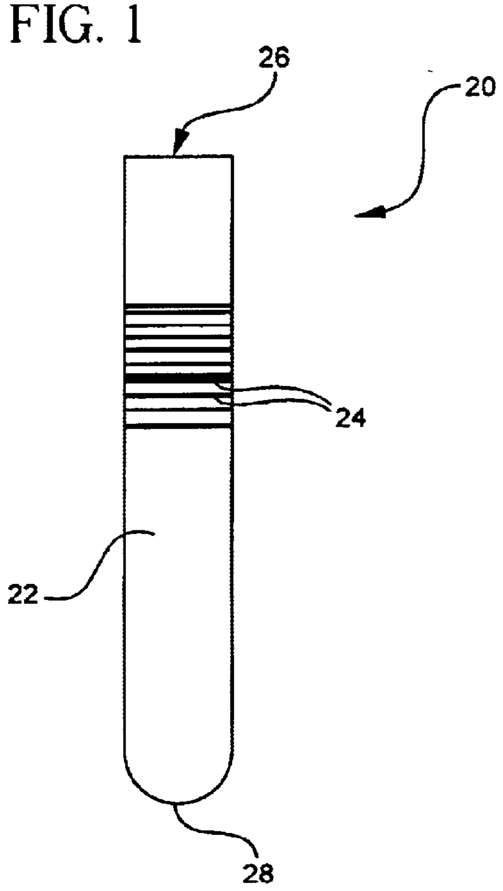
FIG. 1 is a side view of a container containing a biological sample, the container marked for identification in accordance with an embodiment of the invention.

FIG. 1 illustrates a container 20 marked in accordance with one embodiment of the invention. In the embodiment illustrated in FIG. 1, the container 20 is a test tube or vial, although other types of containers may also be used. The container 20 comprises a wall which defines an open top end 26 and closed bottom end 28 of the container 20, and an interior space in which a fluid or other material may be contained. The wall has an outer surface 22 which is curved about a longitudinal axis passing through the top end 26 and bottom end 28 of the container 20. The container 20 may have a wide variety of shapes and configurations other than that described above, as well known to those of skill in the art.

To contain a biological sample, the container 20 may be constructed from a material which is chemically inert with respect to the sample. The container 20 may be substantially transparent in at least one or more locations. For example, the container 20 may be constructed from glass, plastic or other materials well known in the art.

Container Marking

In accordance with the invention, a universally-unique identifier is manufactured onto the container 20. In the embodiment illustrated in FIG. 1, this identifier comprises one or more markings 24. As described in more detail below, the markings 24 are arranged to provide unique identifying information for the container 20.

In one or more embodiments of the invention, the markings 24 define a surface or area having a specular reflectance which differs from that of a surrounding outer surface 22 of the container 24. The term "specular reflectance" refers to the characteristic of a material to reflect light from a source in a direct, rather than a diffuse manner. The terms "higher" or "greater" specular reflectance in relation to a surface mean that light is directly reflected to a greater degree by that surface than by a surface having a "lesser" or "lower" specular reflectance.

In one embodiment, each marking 24 defines a surface which has a specular reflectance which is less than that of the surface of the container 20 adjacent to the marking. In this embodiment, the amount of light that is directly reflected from the marking 24 is less than that reflected by the surface of the container 20 adjacent the marking 24.

In one embodiment, the marking 24 is formed by abrading the outer surface 22 of the container 20 at one or more locations. This method of forming marking 24 is especially effective when the outer surface 22 of the container 20 is smooth and has a high degree of specular reflectance.

One method that may be used to abrade the surface is laser etching. If the container 20 is constructed from plastic, a $CO_2$ laser is especially effective in etching the surface of the container 20. In one embodiment, a laser operating at approximately 3 watts of power is used to etch the outer surface of a plastic test tube.

The outer surface 22 of the container 20 may alternatively be abraded with a diamond or carbide abrading wheel or similar grinding apparatus. The outer surface 22 of the container 20 may also be sandblasted or etched with chemicals.

As described below, in one embodiment, the marking 24, while defining an area having a lower degree of specular reflectance than the surrounding surface is still arranged so that it is substantially translucent, allowing one to see through the marking 24 into the interior of the container 20.

In one embodiment, a thin film material having a specular reflectance that is lower than that of the adjacent outer surface 22 of the container 20 is placed on the container. The film is preferably substantially translucent and may be affixed to the container 20 in a variety of manners. The film may, for example, comprise a thin translucent adhesive tape. Thermal bonding or similar means may also be used to bond the film to the container 20.

In one embodiment of the invention, the marking 24 defines a surface or area having a specular reflectance that is greater than that of the container 20 adjacent to the marking 24. In this embodiment, the amount of light that is directly reflected from the marking 24 is greater than that reflected by the surface of the container 20 adjacent to the marking 24.

If the container 20 is constructed from a plastic having a relatively dull or rough outer surface, the marking 24 may be formed by melting a thin layer of the outer surface 22 of the container 20, producing a melted area of the container 20 that has a smoother surface with a higher specular reflectivity than the surrounding unmelted areas of the container 20. The melting may be accomplished by direct contact with a heated element, by subjecting a portion of the outer surface 22 of the container 20 to an intense source of thermal radiation, or by other means well known to those of skill in the art.

The higher specular reflectance of marking 24 may be produced by a variety of other means, in addition to melting. For example, a thin film having a surface with a high specular reflectance may be placed on the container 20 for defining the marking 24 in a similar manner to that described above for a film having a lower specular reflectance.

As stated above, the marking 24 comprises an area or surface having a specular reflectance different from that of the surrounding surface or area. Thus, the outer surface 22 of the container 20 may have a first specular reflectance, the marking 24 a second specular reflectance, and an area surrounding the marking 24 a third specular reflectance. For example, a translucent tape having a background with one specular reflectance and marked areas having a second specular reflectance may be applied to the outer surface of a container 20 having a third specular reflectance. Marking 24 may thus be defined independently of the outer surface 22 of the container 20.

Those of skill in the art will appreciate that a wide variety of other means exist for defining the markings 24, as part of the manufacturing, or post-manufacturing process.

Marking Configuration

In accordance with the invention, marking 24 may have a variety of configurations and locations on the container 20. In the embodiment illustrated in FIG. 1, each marking 24 comprises a ring which extends around the perimeter of the outer surface 22 of the container 20. Each marking 24 is oriented generally perpendicular to the longitudinal axis that extends along the length of the container 20 from its top end 26 to its bottom end 28.

When the container 20 has other than a cylindrical form, each marking 24 may comprise a band which extends around the perimeter of the container 20. For example, if the container 20 is generally rectangular in shape having four sides and a top and a bottom, each marking 24 may comprise a band that extends around all four sides of the container 20.

Figure 2:
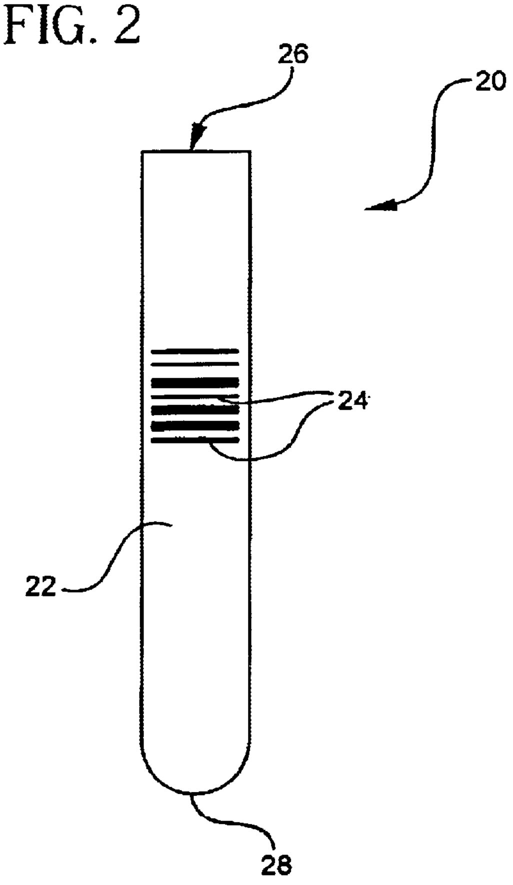
FIG. 2 is a side view of a container containing a biological sample, the container marked for identification in accordance with an embodiment of the invention.

In one or more embodiments, the marking 24 extends only part way around the container 20. In one embodiment, illustrated in FIG. 2, each marking 24 comprises a short bar on the outer surface 22 of the container 20. In this embodiment, the marking 24 has a length that is generally greater than its height, with the length of the marking 24 extending generally perpendicular to the longitudinal axis along the length of the container 20.

Figure 3:
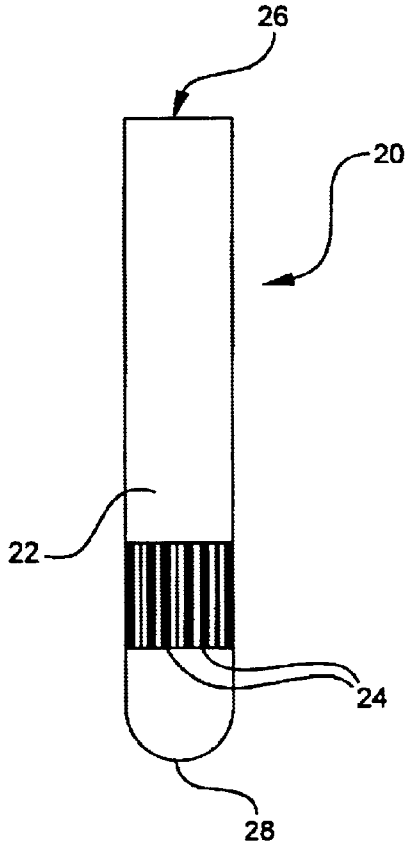
FIG. 3 is a side view of a container containing a biological sample, the container marked for identification in accordance with an embodiment of the invention.

In one embodiment, illustrated in FIG. 3, each marking 24 again comprises a short bar on the outer surface 22 of the container 20. In this embodiment, however, the markings 24 are oriented parallel to the longitudinal axis along the length of the container 20. Thus, where multiple markings 24 are used, individual markings 24 are spaced from one another around the circumference or periphery of the container 20. In this embodiment, an unmarked or open space may be provided on the outer surface 22 of the container 20 along the circumference on which the markings 24 are placed so that the start and end of the markings may be identified.

In one or more embodiments, a group of individual markings 24 are placed on each container 20. The number of markings 24 and their relationship to one another and to the container 20 define a unique identifier and provide a unique identifying or information-providing function for the container and its contents.

To allow each container 20 and its associated biological sample to be uniquely identified, the combinations of marking(s) 24 in one embodiment define a sufficiently large number of unique identifiers such that duplication of an identifier will not be necessary over a long period of time. In this embodiment, each container 20, regardless of size, dimension or other characteristic, is provided with a unique identifier.

The number of unique identifiers desired can be calculated in a number of ways. For example, if it is presumed that 100 billion containers 20 are to be produced each year for 100 years, the marking 24 should accommodate $10^{13}$ unique identifications to prevent duplication of a marking 24 on a container 20.

In addition, however, it may be desired that the markings 24 not only accommodate a unique identifier for each container, but also provide additional information. For example, it may be desired that each container 20 that is produced by a particular manufacturer to include not only the container's unique identifier, but also information about where and by whom the container 20 was manufactured. It may also be desired to include additional information such as the size of the container, to allow containers to be sorted using an automated container handling system, or the chemistry of the container, or other information.

In one embodiment, it is desired that the markings 24 provide $10^{13}*10^{5}$ or $10^{18}$ identifiers to allow the markings to provide $10^{5}$ combinations of additional information. This number of identifiers may be provided by utilizing markings 24 according to the 18 decimal digit Code 128-C bar code which is well known to those of skill in the bar-coding art. When stored in a database, this range of identifiers may be comfortably represented by a double integer. This coding houses $2^{64}$ unique identifiers, which is approximately equal to $1.8*10^{19}$, thus meeting the goal of providing at least $1*10^{18}$ identifiers.

In one or more embodiments, the markings 24 on the container 20, including their size and spacing, are arranged so as to allow the markings 24 to be detected by appropriate detection apparatus (discussed in more detail below). In one or more embodiments, the markings 24 are arranged so as to accommodate their positioning on a variety of different sized containers.

In one embodiment the markings 24 are arranged in accordance with an 18 decimal digit Code 128-C so as to occupy only about one inch of linear space. This arrangement permits the markings 24 to be placed on very small containers 20.

In one embodiment, to ensure that each and every container 20 manufactured by all manufacturers is provided with a unique identifier, the several manufacturers of the containers 20 are each allocated mutally-exclusive subsets of identifiers for use.

In certain of the above-described embodiments, several individual markings 24 cooperate together to provide a unique identifying function. In other embodiments, a single marking 24 or a small number of markings may be configured to provide unique identifying pieces of information. For example, a single marking 24 may comprise an area on a container 20 having a detectably unique shape that functions as an identifier. In addition, the marking 24 may comprise a number of different markings 24 interconnected so as to create a single marked area 24.

Container Identification

The markings 24 are arranged to be detected or identified such that information regarding the container 20 and associated sample may be obtained. In one or more embodiments, a detection apparatus 29 is used for detecting or reading the marking(s) 24 on each container 20.

Figure 4:
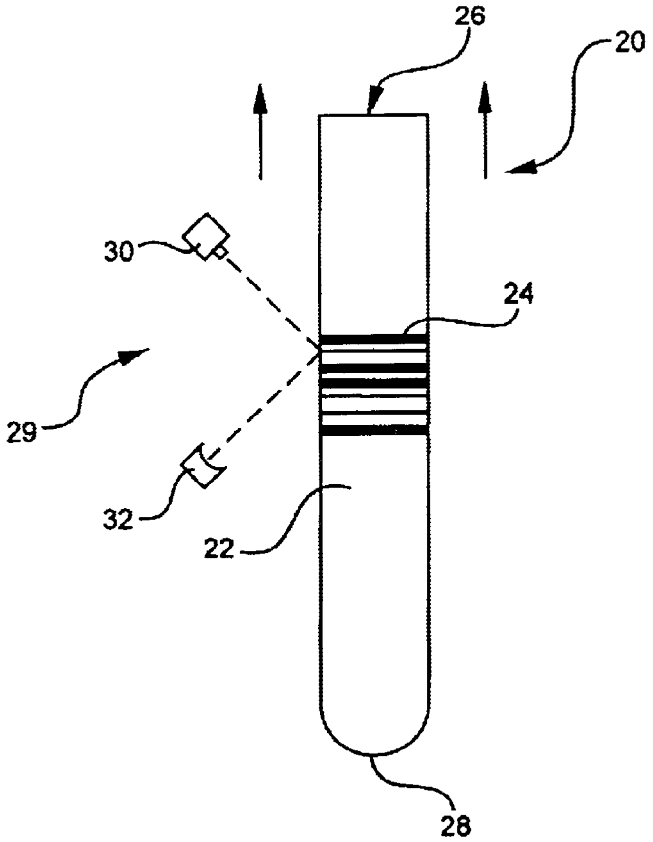
FIG. 4 illustrates an embodiment of a detection apparatus of the invention as utilized to detect markings on a container marked as illustrated in FIG. 1.

In one embodiment, illustrated in FIG. 4, detection apparatus 29 comprises a light-emitter 30 and detector 32. The light-emitter 30 is arranged to project light at an angle towards the outer surface 22 of the container 20. The detector 32 is arranged to detect the specularly reflected light and to output a detection signal based upon the level of reflected light. In one embodiment, detector 32 comprises a Texas Instruments TIL 149 reflecting photosensor adapted for use in such an arrangement.

To detect or read multiple markings 24 on a single container 20, in one or more embodiments the detection apparatus 29 and container 20 are moved relative to one another. In one embodiment, the container 20 is moved with respect to the detection apparatus 29 along an axis extending through the container's top and bottom ends. As the container 20 moves, the projected light impinges upon and reflects off of different portions of the outer surface 22 of the container 20. As illustrated in FIG. 4, the projected light alternately reflects off of the marked areas of the container 20 and the unmarked areas. Because the marked and unmarked areas have different specular reflectivities, the presence and absence of the marked areas can be detected from the level of reflected light measured by detector 32.

In another embodiment, the container 20 remains stationary while the detection apparatus 29 moves relative to the container 20.

Figure 5:
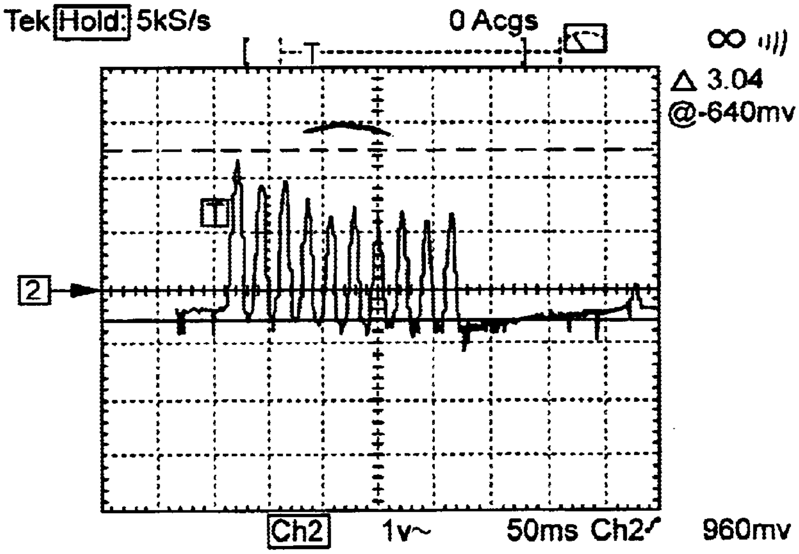
FIG. 5(*a*) is a graph illustrating the output of a detection apparatus of the invention utilized to detect markings formed by laser-etching.
Figure 5:
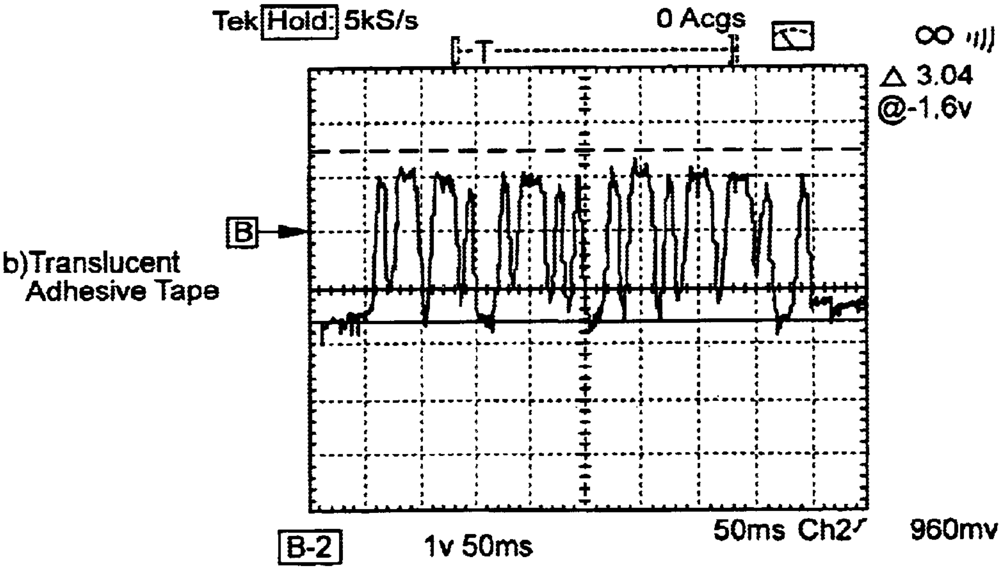

FIGS. 5(*a*) and 5(*b*) illustrate examples of an output signal obtained from a light emitter-detector pair in one embodiment when utilized to detect spaced markings 24 on a container 20. The output signal indicates the amount of reflected light detected versus time. FIG. 5(*a*) illustrates an example output signal obtained when the markings 24 constitute laser etched areas of the outer surface of the container. FIG. 5(*b*) illustrates an example output signal obtained when the markings 24 comprise areas of translucent adhesive tape applied to the outer surface 22 of the container 20. In both instances, the markings 24 are clearly identifiable as peaks in the output signal, while the unmarked areas comprise "valleys" or dips in the output signal.

In one or more embodiments, detection apparatus 29 comprises a charge-coupled device (CCD) arranged to detect the light reflected from the whole of the marked portion of the container 20 without requiring relative movement between detection apparatus 29 and the container 20. The light source may comprise dispersed light sources, such as, for example, a filament lamp or an array of LEDs. To maximize the intensity of reflected light, the CCD and container may be oriented so that the CCD is centered in the area of maximum reflection. The CCD provides an output signal that indicates the amount of light that impinges at points along its length. The output signal of the CCD can therefore be utilized to detect markings 24.

Regardless of the detection apparatus employed, the output of the detection apparatus is used to read the markings 24 of a container 20 to identify the container 20 and its associated identifying information. In one embodiment, each set of markings 24 for a particular container 20 is associated with certain information, such as a unique container identifier, manufacturer information and the like. This information may, for example, be stored in an appropriate memory that associates a particular set of information with a particular set of markings 24. The information may be in the form of numbers, letters or combinations thereof.

The detection apparatus 29 provides an output signal that can be utilized by an appropriate processing mechanism to match the stored information corresponding to a particular container 20 to a particular set of sensed markings 24. A user of the container 20 may thus scan or detect the markings 24 on a particular container 20 and obtain the corresponding information.

In one or more embodiments, a user of a particular container 20 may modify an information database associated with a container 20. For example, a hospital may modify the information corresponding to a particular container 20 once a biological sample has been placed into the container 20 to associate that container with the biological sample. The information database can contain patient, sample and other data corresponding to that particular container 20.

Figure 6:
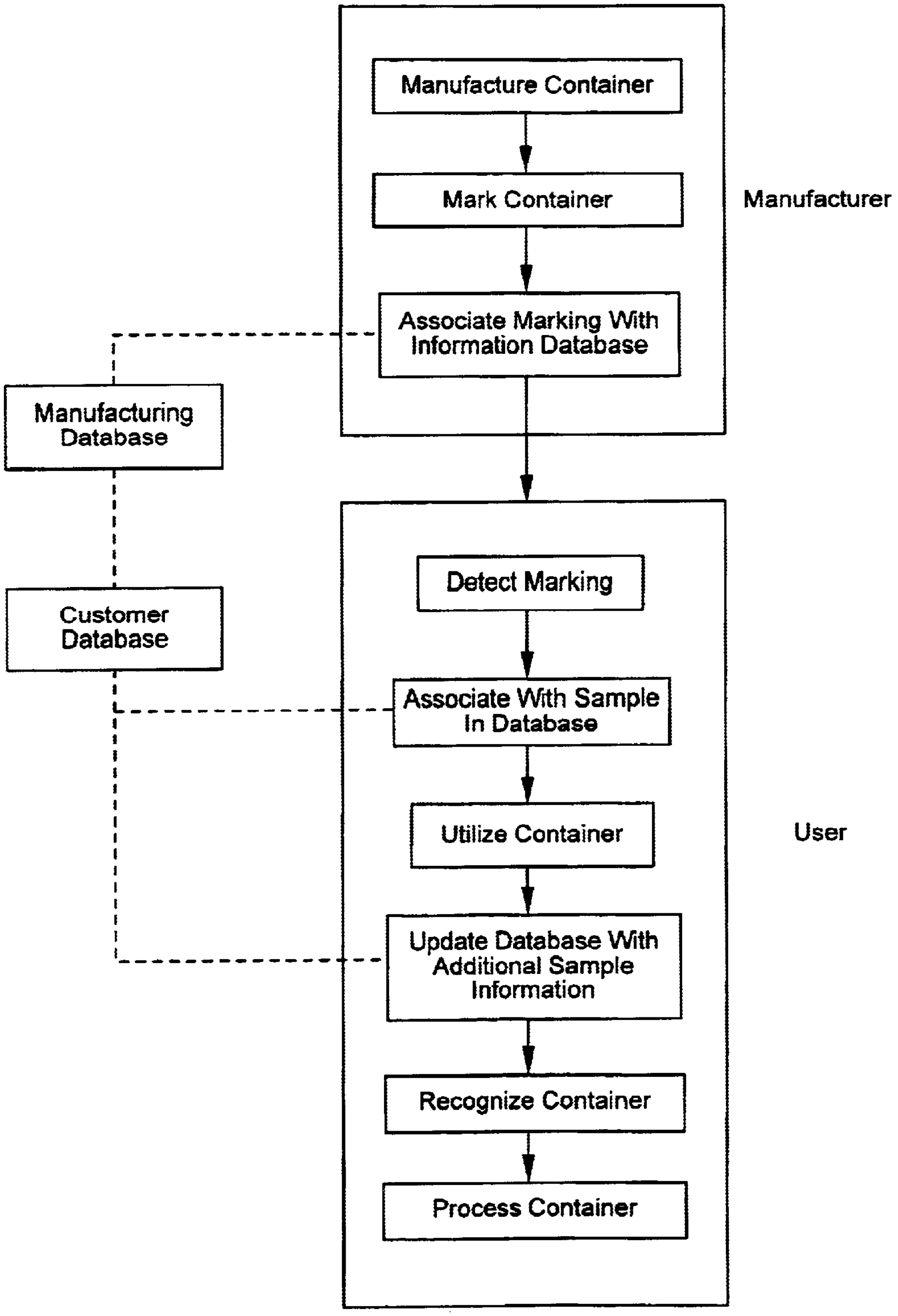
FIG. 6 is a flow diagram illustrating container manufacture, marking and use according to an embodiment of the invention.

In one embodiment, illustrated in FIG. 6, the identifier of a container 20 is provided by the manufacturer. In this embodiment, the manufacturer of the particular container 20 manufactures the container 20 and marks it with markings 24. The particular markings 24 of a particular container 20 comprise an identifier that is verifyably unique among containers previously manufactured (using information in the manufacturer's database). For example, the information in the database associated with a particular marking 24 of a particular container 20 may identify container 20 as container number "55900" manufactured by XYZ company. The database may be maintained by the manufacturer, by an organization of manufacturers, or by some other entity or entities. Access to the database may be provided by means well known to those of skill in the art, such as by direct computer link or the Internet.

In this embodiment, when the first user of the container 20 obtains the container from the manufacturer, a reseller or other source, the user detects the markings 24 and associates the container ID with an intended use of the container retrieved from the user's database. This intended use might include, for example, a patient ID and test ID already waiting in the database for commitment of a container ID to house this test. For example, the patient ID and test ID might be patient "John Doe, Social Security No. 123-45-6789, blood sample 1 taken 1-1-1998." On the first use of the container, this information is associated with the container ID as a means of tracking what is in the container.

Subsequent users of the container 20, both human and automated machines, may obtain this information by detecting the identifier and using the identifier to query the corresponding database. Subsequent users may also add to the information in the database. For example, a laboratory that conducts tests on the sample contained in the container may add test result information.

In this embodiment, information remains associated with the container 20 as it is moved or transferred, without the information having to be printed on a label as in the prior art. This ensures transportability of the sample ID as well as patient confidentiality.

Advantages of the Invention

Many advantages are realized using the method and apparatus. The invention provides a system and method for uniquely identifying containers and associated biological samples that may be universally implemented. Implementation of the method does not require the development of a specific coding or labeling scheme by a particular end user. To utilize the system and method of the invention, the end user need not obtain special equipment for coding or marking the containers. The end user need only obtain the necessary detection equipment and have access to appropriate means to interface with and modify the information associated with the container in the relevant database.

Further, the identifier associated with each individual container can be used to not only identify the particular container, but also to provide other information about the container, such as, for example, manufacturer, container make-up and the like.

Further, the specimen, once identified by container ID, may be transported across institutional boundaries under a single, universal ID. A second user environment may obtain the information it needs by querying the database in the first user environment.

Another advantage is that the markings 24 are indelible and not separable from the container 20.

Another advantage is that the markings 24 also do not change the physical dimensions of the container 20, simplifying the task of automatically handling the container.

When the markings 24 comprise rings which extend around the perimeter of the container 20, the container 20 need not be oriented in any specific fashion in order for the markings 24 to be detected. This eliminates the need for human or automated container alignment with the detection apparatus.

The markings 24 also do not interfere with viewing of the contents of the container. The markings 24 are, in one or more embodiments, substantially translucent as compared to common bar coding that comprises dark ink printed on a light substrate, both of which are opaque. The markings 24 of the present invention generally comprise only changes in the surface smoothness of the container 20, and not the color. Thus, when the container 20 is relatively translucent, the markings 24 comprise areas of the container 20 which are similarly translucent.

Another advantage of the markings of the invention is that the contents of the container 20 do not interfere with the detection of the markings 24.

Figure 7:
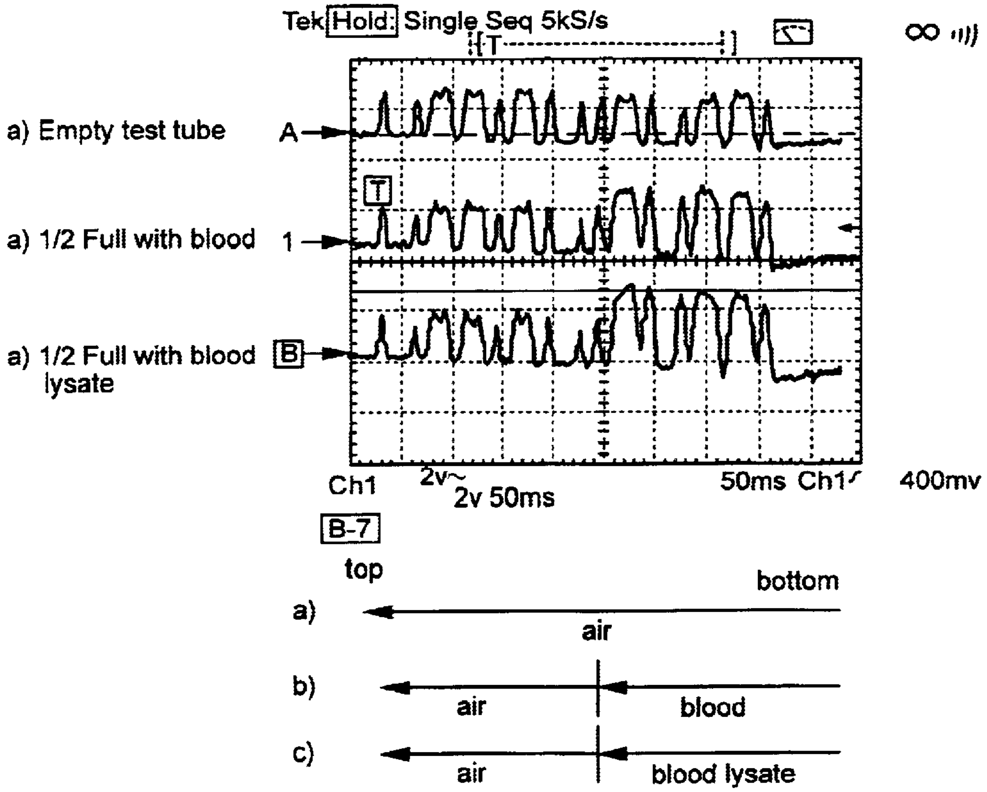
FIG. 7 is a graph illustrating the output of a detection apparatus of an embodiment of the present invention utilized to detect markings formed on a container which is (a) empty; (b) half full of blood and (c) half full of blood lysate.

FIG. 7 graphically illustrates the ability to detect a container identifier in accordance with the invention independent of the contents of the container 20. Line (a) of FIG. 7 represents the output of a detection apparatus 29 used to detect the markings 24 on a container 20 when the container is empty. Line (b) of FIG. 7 represents the output of the detection apparatus 29 when the container 20 is half full of blood. Line (c) of FIG. 7 represents the output of the detection apparatus 29 when a container 20 is half full of a blood lysate mixture. In the tests performed to obtain the data represented by Lines (b) and (c), the markings were arranged so that the meniscus of the fluid was positioned approximately midway along the length of the marked areas, and the markings 24 were defined by translucent adhesive tape.

These results also demonstrate that the detection apparatus 29 may in some instances be used to detect the level of the contents of the container 20. Referring to Lines (b) and (c), while the ability of the detection apparatus 29 to detect the markings 24 regardless of the contents is clear, a slight change in the amplitude of the output is noted between those areas of the container scanned which did and did not contain fluid. Thus, by monitoring changes in the average amplitude of the output of the detection apparatus 29, given the output illustrated in FIG. 7, one may detect a relative fluid level of the container 20.

Another advantage of the present invention is that the markings 24 used to form the identifier are not of a human readable form. This ensures confidentiality of the information associated with the sample.

The foregoing description is that of example embodiments of the invention. It will be understood to those of skill in the art that various changes and modifications may be made without departing from the spirit and scope of the invention, as defined by the claims.

What is claimed is:

1. A method for identifying a biological sample associated with a container, comprising:

providing a container suitable for receiving a biological sample;

providing a first database for storing information relating to said container;

marking said container with a universally unique identifier which distinguishes said container from other like containers independently of the contents of said container;

associating said universally unique identifier with container information stored in said first database;

placing a biological sample in said container;

providing a second database for storing information relating to said biological sample; and associating said universally unique identifier with sample information stored in said second database.

2. The method of claim 1, wherein said container information identifies at least one of a manufacturer of said container and a characteristic of said container.

3. The method of claim 1, wherein said first database is maintained by a manufacturer of said container.

4. The method of claim 1, wherein said first database is maintained by an organization of container manufacturers.

5. The method of claim 1, wherein said first database is accessed by at least one of a direct computer link and the Internet.

6. The method of claim 1, wherein said sample information includes at least one of a patient identification and a test identification.

7. The method of claim 1, further comprising using said universally unique identifier to query said second database and thereby retrieve said sample information.

8. The method of claim 1, further comprising using said universally unique identifier to modify said sample information stored in said second database.

9. The method of claim 1, wherein said second database is maintained by a user of said container.

10. The method of claim 1, wherein said universally unique identifier provides the equivalent of at least 12 decimal digits.

11. The method of claim 1, wherein said universally unique identifier provides the equivalent of at least 18 decimal digits.

12. The method of claim 1, wherein said universally unique identifier comprises one or more first areas on an outer surface of said container having a first specular reflectance which differs from a second specular reflectance of a second area adjacent to said first area.

13. The method of claim 12, wherein said first specular reflectance is less than said second specular reflectance.

14. The method of claim 13, wherein said marking step comprises laser etching said outer surface of said container to define said one or more first areas.

15. The method of claim 13, wherein said marking step comprises abrading said outer surface of said container to define said one or more first areas.

16. The method of claim 13, wherein said marking step comprises applying a thin film member to said outer surface of said container.

17. The method of claim 12, wherein said first specular reflectance is greater than said second specular reflectance.

18. The method of claim 17, wherein said marking step comprises melting said outer surface to define said one or more first areas.

19. The method of claim 12, further including detecting said one or more first areas of said outer surface of said container.

20. The method of claim 19, wherein said detecting step comprises projecting light toward said outer surface of said container from a source and sensing light reflected by said container from said source.

* * * * *